(12) United States Patent
Facory et al.

(10) Patent No.: US 11,789,711 B2
(45) Date of Patent: Oct. 17, 2023

(54) USING ARTIFICIAL INTELLIGENCE TO OPTIMIZE SOFTWARE TO RUN ON HETEROGENEOUS COMPUTING RESOURCE

(71) Applicant: MERCURY MISSION SYSTEMS, LLC, Andover, MA (US)

(72) Inventors: Omar Facory, Torrance, CA (US); Andrew Kostrzewski, Garden Grove, CA (US)

(73) Assignee: MERCURY MISSION SYSTEMS, LLC, Andover, MA (US)

( * ) Notice: Subject to any disclaimer, the term of this patent is extended or adjusted under 35 U.S.C. 154(b) by 0 days.

(21) Appl. No.: 17/559,668

(22) Filed: Dec. 22, 2021

(65) Prior Publication Data
US 2022/0206770 A1   Jun. 30, 2022

Related U.S. Application Data

(60) Provisional application No. 63/132,375, filed on Dec. 30, 2020.

(51) Int. Cl.
*G06F 8/41* (2018.01)
*G06N 3/10* (2006.01)

(52) U.S. Cl.
CPC .............. *G06F 8/47* (2013.01); *G06F 8/427* (2013.01); *G06N 3/10* (2013.01)

(58) Field of Classification Search
CPC .............. G06N 3/10; G06F 8/427; G06F 8/47
See application file for complete search history.

(56) References Cited

U.S. PATENT DOCUMENTS

| 10,296,437 B2 * | 5/2019 | Ismael ................... G06F 11/36 |
| 2013/0155080 A1 * | 6/2013 | Nordlund .............. G06T 15/005 345/522 |
| 2014/0149969 A1 * | 5/2014 | Brower .................. G06F 8/423 717/140 |
| 2018/0121180 A1 * | 5/2018 | Chen ..................... G06F 8/4441 |
| 2020/0202251 A1 * | 6/2020 | Dobrovolsky ........ G06F 9/5044 |

* cited by examiner

*Primary Examiner* — Phillip H Nguyen
(74) *Attorney, Agent, or Firm* — Sheppard, Mullin, Richter & Hampton LLP

(57) ABSTRACT

Systems and methods are described that implement a tool chain which receives original software source code, analyzes the code and divides the code into modules that run optimally on the available heterogeneous resources. For example, the toolchain system segments original source code into code segments, and determine the specialized processor resource, such as a digital signal processing (DSP) processor, Field Programming Gate Array (FPGA), Graphical Processing Unit (GPU), and the like, that most optimally performs computations of the particular code segment. A parsing engine determines the processor of the heterogenous resources, based on a set of rules and/or a trained classifier (e.g., a trained machine learning model). New code segments can be generated that can be executed on the determined type of processor. Further, the system enables application programming interfaces (APIs) that can interface the new code segment with other generated code segments and/or some portions of the original code.

20 Claims, 8 Drawing Sheets

USING ARTIFICIAL INTELLIGENCE TO OPTIMIZE SOFTWARE TO RUN ON HETEROGENEOUS COMPUTING RESOURCE

RELATED APPLICATION

This application claims the benefit of U.S. Provisional Application No. 63/132,375, filed on Dec. 30, 2020, the contents of which are incorporated herein by reference in their entirety.

TECHNICAL FIELD

This disclosure relates to computer processing environments, particularly optimizing software for execution on specialized heterogenous computer platforms.

BACKGROUND

Computing categories lend themselves for more optimal execution on specialized platforms. For example, operations that require repetitive multiply and accumulate operations may be best executed using digital signal processors (DSPs), while those that require coordinate transformations may be best executed on graphical processing units (GPUs).

Certain processes, such as performing a convolution on many pixels or iterating a mathematical operation, can consume significant bandwidth and power when performed serially using a conventional microprocessor. In embedded applications, such as airborne applications, available power may be limited, and cooling is challenging in avionics bays that are full of operating electronic devices. Thus, cooling, bandwidth and consumed power need to be carefully managed. Without careful management of these parameters, the reliability of components are often impacted by chronic over-temperature, therefore performance and availability of critical equipment may become limited as a consequence.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. According to the present disclosure, As previously alluded to, there are several advantages that can be realized in computing environments by achieving optimization of certain computing processes that are executing on heterogeneous platforms. A currently employed solution involves parallelizing such processes and exchange fast central processing unit (CPU) clock speeds for multiple parallel paths. This spatial/temporal exchange can provide benefits in both power consumption and performance. Field Programmable Gate Array (FPGA) devices have been evolving for many years and their development tools are becoming more effective and user-friendly. Moreover, automatic FPGA code generation from models and software code is becoming more accepted. In conventional cases, however, in order to enjoy the benefits of FPGAs, the code has to be either written from scratch or converted wholesale from existing software code or model-based systems engineering (MBSE) models. Furthermore, this can include optimizing along the algorithmic axis, but not necessarily intelligently distributing execution modules onto a heterogeneous architecture, with modules running on the best possible platform, such as DSP, CPU, FPGA, GPU processing elements, or the like. Accordingly, the disclosed embodiments implement a tool chain that starts with software source code, analyzes the code, and then divides the code into modules that can run more optimally on the available heterogeneous resources.

Figure 1:
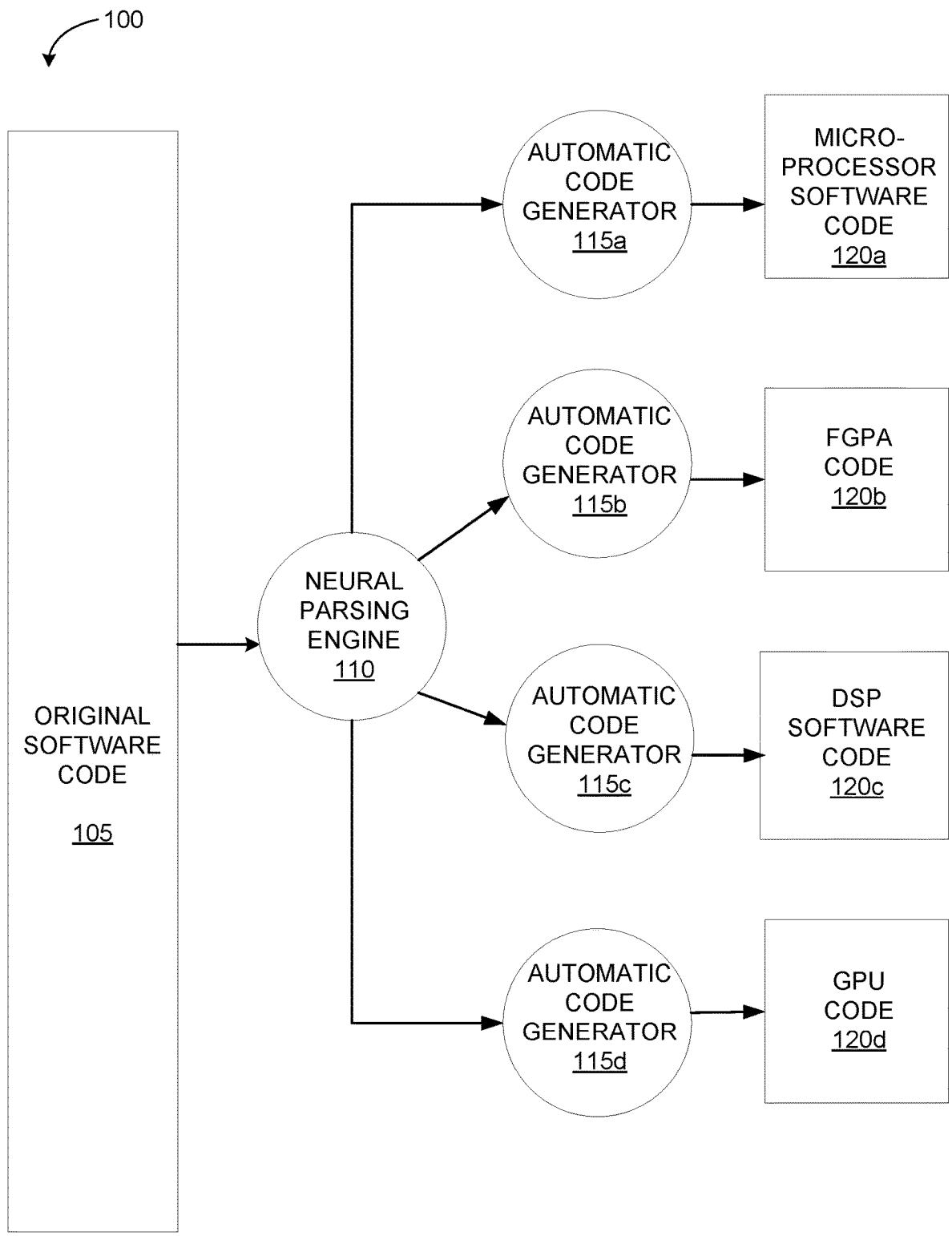
FIG. 1 illustrates an example of a toolchain system which can optimize software code for heterogeneous computing resources, in accordance with some embodiments.

FIG. 1 illustrates an example of a system 100 implementing a heterogenous processing optimization toolchain. The toolchain system 100 is shown to include a neural parsing engine 110. The neural parsing engine 110 can be trained using a large set of source code, which is shown in FIG. 1 as original software code 105. Thus, the toolchain system 100 utilizes artificial intelligence (AI) and/or machine learning (ML), such as automated training (of machine learning models) and deep learning approaches, in order to ultimately optimize software for running on various heterogenous computing resources. The original software code 105, or source code, can contain different algorithms which are empirically evaluated for best performance on the heterogeneous computing resources or each computing resource thereof. Further, another large set of source code can be used to test the neural network for optimal performance. The aim is to produce fully trained networks that can match the code task to be performed with the optimal computing resource, where the various computing resources can include, but not limited to: CPU; DSP; GPU; FPGA; and the like.

Figure 2:
FIG. 2 includes a table of examples of fixed rules utilized by a neural parsing engine of the system shown in FIG. 1, in accordance with some embodiments.

In one implementation of the neural parsing engine 110, a set of fixed rules are implemented to parse the portions of the inputted code that could be directed for optimal execution to diverse heterogeneous processing components. FIG. 2 shows a table 200 that includes examples of fixed rules that can be utilized to program the neural parsing engine 110. For example, FIG. 2 shows that rules include: a code task of iterative processes can be matched to an FPGA as the optimal computing resource; a code task of matrix operation can be matched to GPU, FPGA, and DSP as the optimal computing resources; a code task of close repetitive memory use can be matched to FPGA as the optimal computing resource; a code task of timing operations with dwell loops can be matched to FPGA as the optimal computing resource; a code task of signal processing can be matched to FPGA and DSP as the optimal computing resources; a code task of recursion can be matched to a CPU as the optimal computing resource; a code task of graphic transformations can be matched to GPU and FPGA as the optimal computing resources; a code task of logic operations can be matched to a CPU as the optimal computing resource; and a code task of floating point math can be matched to a CPU as the optimal computing resource.

In another implementation of the neural parsing engine 110, a neural network can be trained to segment the inputted code. These segments can then be directed for optimal execution in diverse heterogeneous processing components.

FIG. 1 shows that the toolchain system 100 can include multiple code generation engines 115a-115d. After analysis is performed by the neural paring engine 110, the next stage of the system's 100 function is to select, and subsequently utilize, one of the code generation engines 115a-115d that can generate an optimal code to run on specified computing resources. Designers or systems/tools that are used by the designers can generate algorithms in large application files, and run them for correctness of logic on a host platform. Then when the logic is confirmed, the code can be processed through the proposed toolchain system 100 to generate an optimal code, using one of the code generation engines 115a-115d, which can run on the target heterogeneous computing modules, thereby optimizing performance, power consumption, and thermal signature.

As an operational example of the toolchain system 100, the original software code 105 can be legacy code that was written for a particular type of processor. Each code segment of the original software code 105 can be focused on different types of computations including, for example, computations that perform a convolution on many pixels, that iterate over a loop, and/or that are recursive. As alluded to above, different types of processing platforms, such as DSPs, CPUs, FPGAs, GPUs, and the like may perform a particular code segment with better temporal, memory, thermal, or performance than others. To this end, the toolchain system 110 can segment of the original software code 105 into a plurality of code segments, where the neural parsing engine 110 can determinate a type of a processor (or platform) that most optimally performs computations for that particular code segment. The neural parsing engine 110 can make the determination of the type of the processor based on a set of rules and/or a trained classifier (e.g., a trained machine learning model). The present technology enables generation of new code segments for a code segment of the original code such that the new code segment can be executed on the determined type of processor. As illustrated in FIG. 1, the automatic code generator 115a can generate new code segments, namely micro-processor software code 120a, that is to be particularly executed on a CPU. The automatic code generator 115b can generate new code segments, namely FGPA code 120b, that is to be particularly executed on a FPGA processor. Additionally, the automatic code generator 115c can generate new code segments, namely DSP software code 120c, that is to be particularly executed on a DSP processor. Lastly, the automatic code generator 115d can generate new code segments, namely GPU code 120d, that is to be particularly executed on a GPU processor.

The neural parsing engine 110 is configured such that parsing can be accomplished by defining rules to fill a multi-dimensional vector of parameters. These parameters can include proxies for memory access, parallelization, looping, recursion, decisions, repeated operations, timing, etc. A basis for quantification can be defined and implemented to quantify each of the dimensions (parameters) in the vector.

Components of the toolchain system 100, such as the neural processing engine 110, and the automatic code generators 115a-115d may be a implemented as a combination of software, hardware, firmware, and the like on one or more computing devices or server computers, or the like, and may include a processor, which may be a semiconductor-based microprocessor, a central processing unit (CPU), an application specific integrated circuit (ASIC), a field-programmable gate array (FPGA), and/or another hardware device. For example, the toolchain system 100 may include be implemented as a single computer device with multiple processors, multiple cores, or the like, or alternatively as multiple computer devices, without departing from the scope of the system. In some implementations, the neural parsing engine 110 can be implemented as a hardware, such as a semiconductor-based microprocessor, a central processing unit (CPU), an application specific integrated circuit (ASIC), a field-programmable gate array (FPGA), and/or another hardware device, software, firmware, or any combination thereof.

The computer device implementing the toolchain system 100 may also include a non-transitory computer readable medium that may have stored thereon machine-readable instructions executable by the processor.

Figure 3:
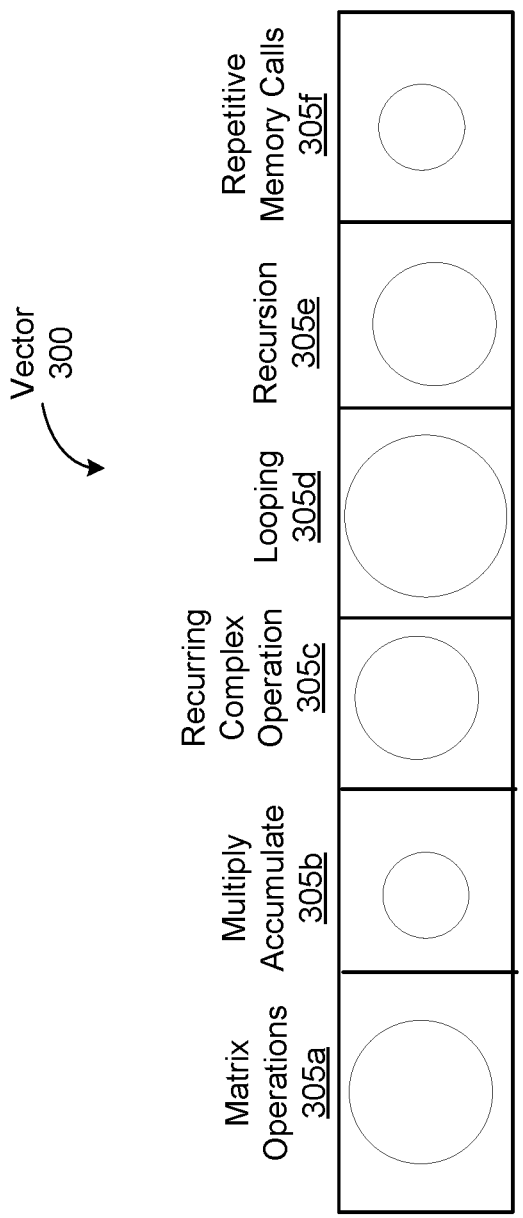
FIG. 3 depicts an example of a vector of parameters for a code segment that can be optimized by the toolchain system shown in FIG. 1, in accordance with some embodiments.

FIG. 3 illustrates an example of a vector 300 of parameters 305a-305d of code segment. In the example of FIG. 3, the size of the circle under the corresponding parameter, represents the quantification of that parameter. For example, FIG. 3 shows multiple parameters 305a-305f of the vector, where the parameters include: matrix operations 305a; multiply accumulate 305b; recurring complex operation 305c; looping 305d; recursion 305e; and repetitive memory calls 305f. FIG. 3 also includes a circle under each of the dimensions (parameters 305a-305d) in the vector 300 which represents their corresponding quantification.

Figure 4:
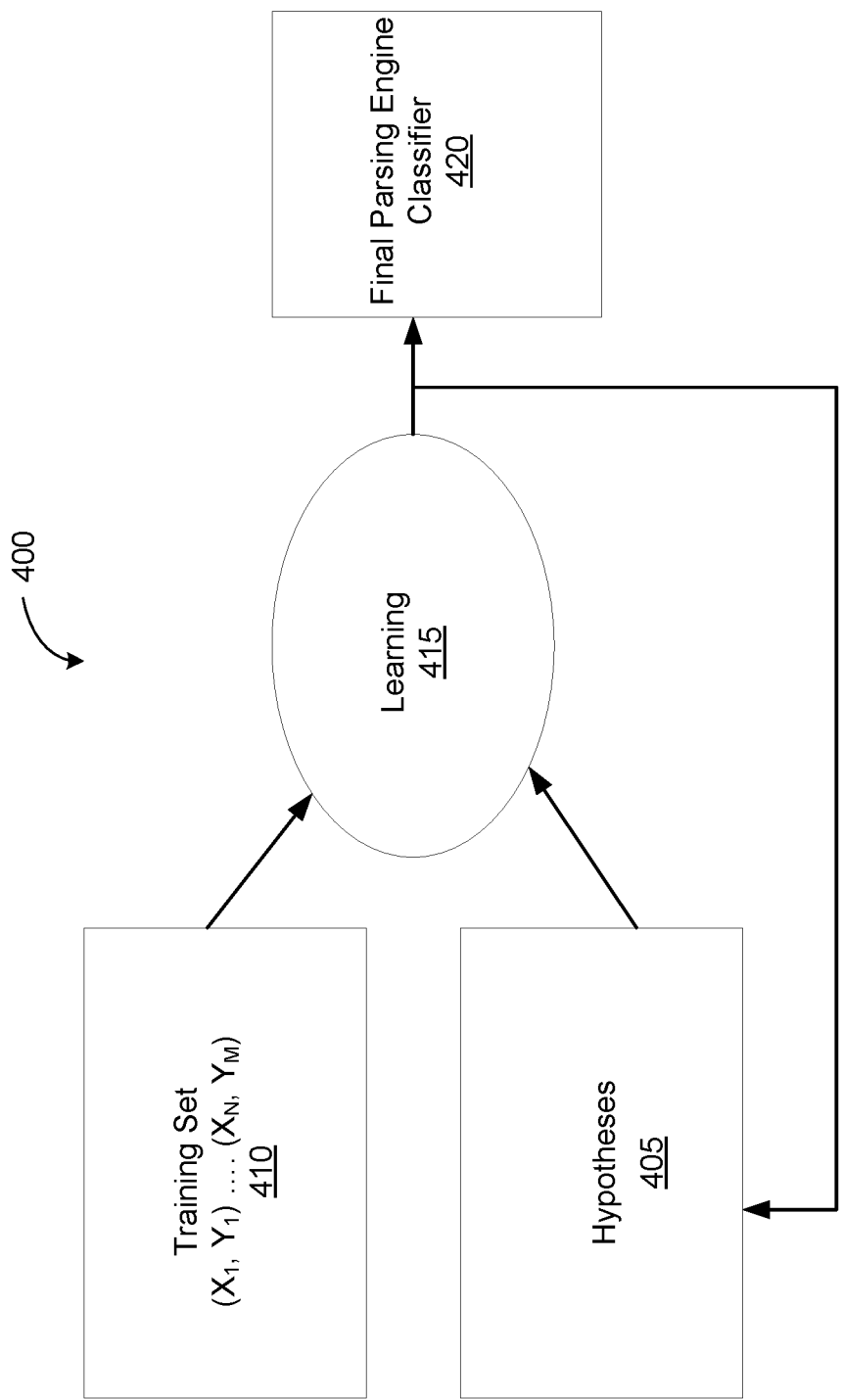
FIG. 4 depicts an example of a process for training the neural parsing engine of the system shown in FIG. 1, in accordance with some embodiments.

Referring now to FIG. 4, an example of a training process 400 for the aforementioned neural parsing engine (shown in FIG. 1) is depicted. In some embodiments, the disclosed neural processing engine employs AI/ML models, that can be trained and refined in accordance with machine learning and deep learning aspects. Thus, the process 400 can be an AI/ML-based process, which begins by initially forming hypotheses 405 regarding parameters (e.g., parameters of a vector of a code segment) and sample code segments for each can be executed in various computing platforms and timing and power consumption can be measured. This can form the basis for learning 414 and for in-sample error to be carried forward in a final parsing engine 420. Learning can be accomplished on large samples of code, and then verified to establish the best similarity between in and out of sample errors. Once this is accomplished, the parsing engine can categorize code segments based on their assigned vectors of parameters depending on where they fall on the hyperspace and how it is segmented by a hyperplane that defines on which computing platform is the code segment most optimally run. As illustrated in FIG. 4, by naming the vector of code segment Xn and its corresponding computing platform Ym, training samples $(X_1, Y_1)$, $(X_2, Y_2)$ and so forth to (Xm, Yn) can be represented to generate a training set 410. These samples of the training set 410 can be matched with the hypotheses 405 for classification, which are in turn adjusted to reach the most accurate hypothesis. An accurate hypothesis can be determined as the hypothesis that minimizes the difference between the in-sample and out of sample error.

The process 400 may be implemented as machine-readable instructions on a non-transitory computer readable medium. Examples of non-transitory computer readable medium may include an electronic, magnetic, optical, or other physical storage device that contains or stores executable instructions. For example, the non-transitory computer readable medium 312 may be a Random-Access memory (RAM), an Electrically Erasable Programmable Read-Only Memory (EEPROM), a hard disk, an optical disc, or other type of storage device. Accordingly, for example, a processor may fetch, decode, and execute the machine-readable instructions in order to implement the actions of process 400 in order to train the neural processing engine.

Figure 5:
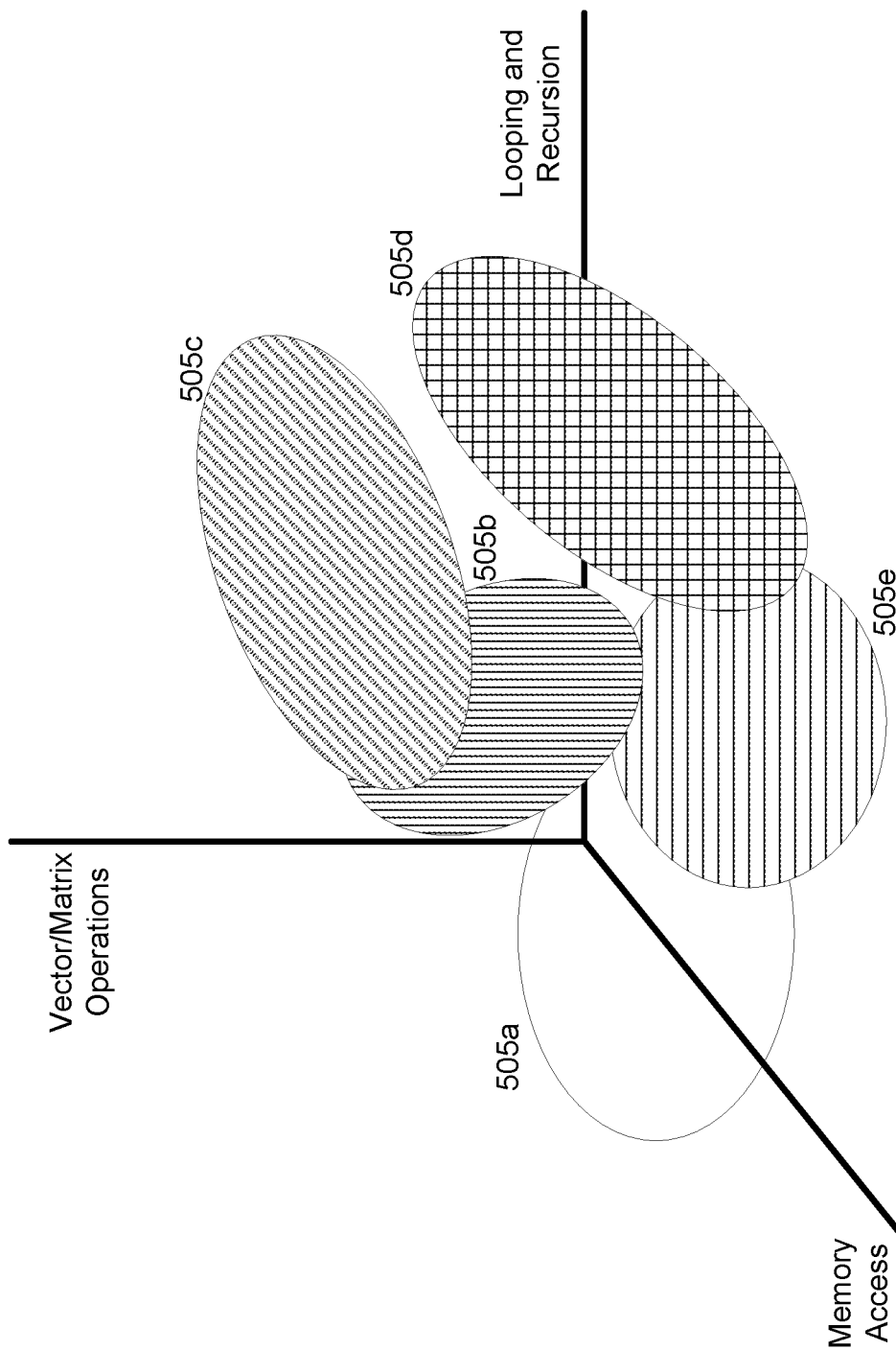
FIG. 5 depicts an example of code categorization based on the classification of the inputted vector of parameters shown in FIG. 3, in accordance with some embodiments.

Referring now to FIG. 5, an example of code categorization is depicted. As described herein, code categorization can be based on the classification of the inputted vector of parameters (shown in FIG. 3). The categorization is represented as a three-dimensional space 500, which is based on three mutually perpendicular coordinate axes representing parameters: the x-axis representing looping and recursion, the y-axis representing vector matrix operations, and the z-axis representing memory access. The three-dimension space 500 also includes multiple classifier spaces 510a-510e (represented in FIG. 5 by shaded ovals). Each of the classifier spaces 510a-510e can represent an optimal computing platform for the associated scattered data clusters, which represent code segments. Although the example of FIG. 3 shows a three-dimensional, an overall space can have as many dimensions as the vectors of parameters (e.g., vector of parameters shown in FIG. 3).

Referring back to FIG. 4, the process 400 can be validates by segmenting samples of large legacy code with in-service history using the hypotheses 405. These segments can then be re-written and executed on multiple computing platforms. The computing platforms can be any combinations of DSP, GPU, FPGA, GPU and classic CPU, etc. Errors, such errors as clock speeds and silicon process (7 nm vs 24 nm etc.) can be normalized-out during the validation. Scores are then collected and used for "in-sample" versus "out-of-sample" error minimization such that $|E_{in}-E_{out}|$ is closest to zero when a large sample is used.

Figure 6:
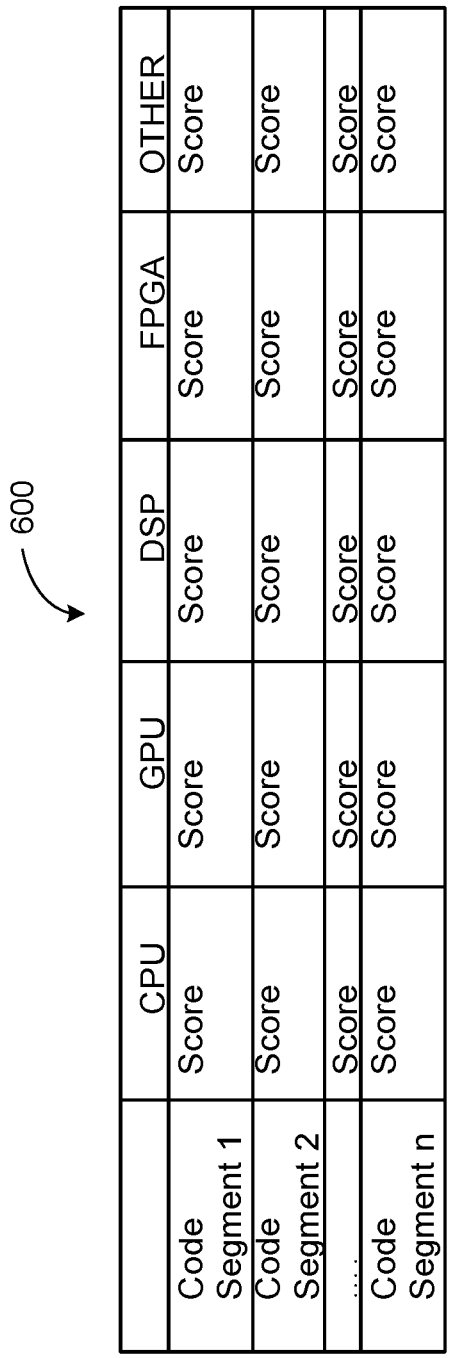
FIG. 6 includes a table of examples of scores that may be generated during training and validation of the neural parsing engine of the system shown in FIG. 1, in accordance with some embodiments.

In FIG. 6, a table 600 is shown that includes examples of scores that may be generated related to best execution. For example, table 600 shows scores for best execution for training and validation for a code segment associated with a respective computing platform.

Figure 7:
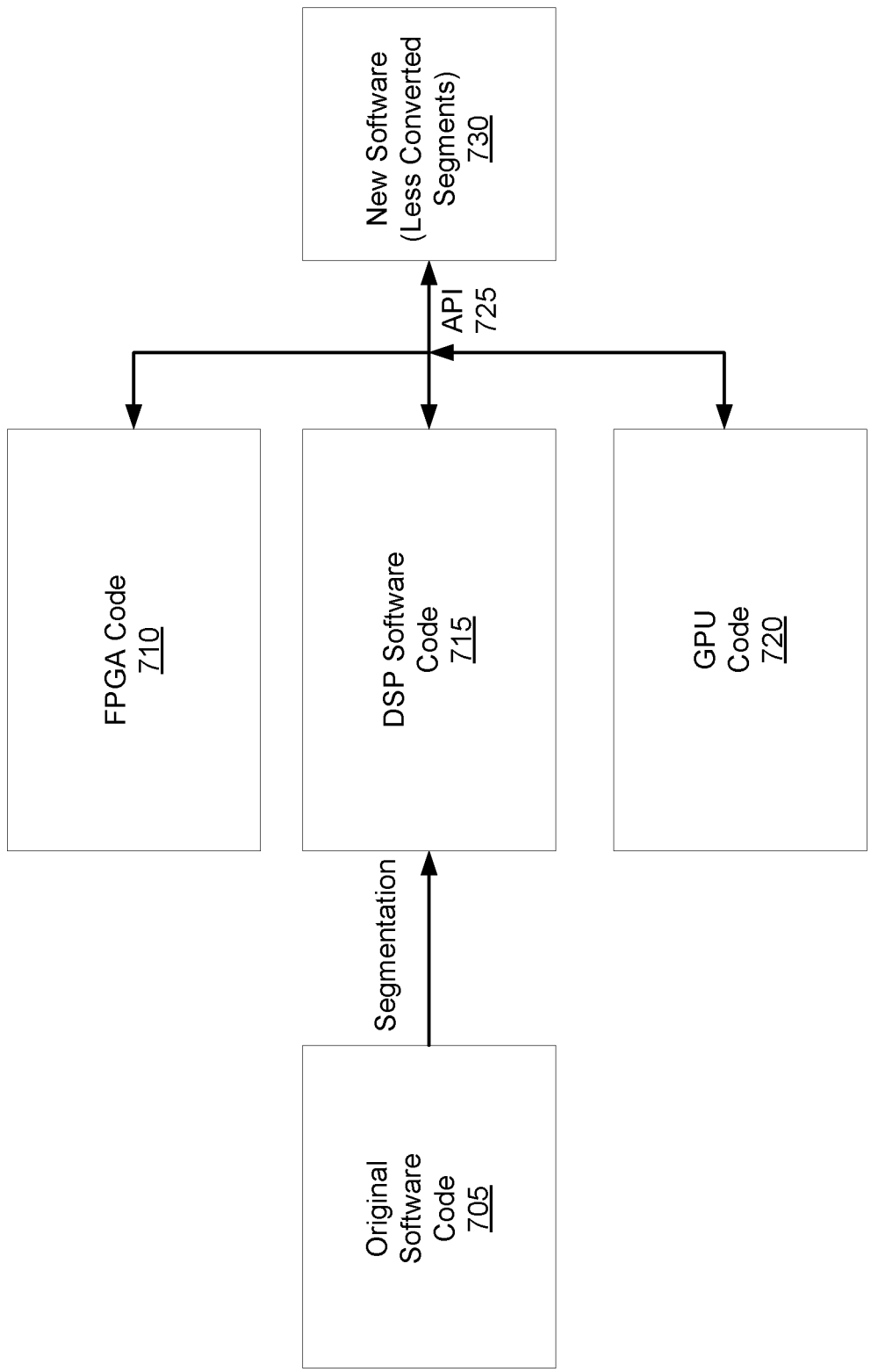
FIG. 7 depicts an example process for recombining heterogeneous software code segments that can be implemented by the toolchain system shown in FIG. 1, in accordance with some embodiments.

FIG. 7 illustrates an example of the toolchain system's function of recombining heterogenous parts of code. According to some embodiments, recombing shown in FIG. 7 is a post processing function. For instance, in order to function properly, a computing system may require post processing reconstruction, such that the new heterogeneous code segments are executable in concert with their respective computing platforms. FIG. 7 illustrates that original software code 705 can be segmented. In the example, the heterogenous code segments that result from segmenting the original software code 705, can include: FPGA code 710; DSP software code 715; and GPU code 720. Application programming interfaces (APIs) 725 can be created to form the gateways between the various amalgamated modules. These APIs 725 can be auto generated to maintain the functionality of the original code. Ultimately, the system can recombine the heterogenous code segments 710, 715, and 720 to generate new software 730, where the new software 730 is comprised of less converted segmented.

Given that the classification of the legacy code is performed to be optimal on specific hardware with given resources, it can be important to perform the classification particularly to fit the new environment. As an example, it may not be useful to classify code segments as optimal for DSP, if the new environment does not have DSP processors. Moreover, it is often desirable to favor one resource over other resources, for instance if the other resources are at capacity, or if the other resources are less favorable for a reason. The disclosed tool chain system, therefore, can include mechanisms, such as user interface, that is configured to allow:

1. Favoring certain resources over others if they are plentiful, or less inexpensive (dollar, watt, availability.) than others
2. Customize the process to eliminate optimization for unavailable resources.
3. Allow fine-tuning in case of clock throttling or processor upgrades etc.
4. Favor the use of one resource over another based on the utilization of secondary resources such as memory, transceivers, I/O, pins, cooling etc.
5. Allow the operator to generate simultaneous output for multiple processing platforms for empirical analyses Accordingly, the user interface of the toolchain system can improve predictive and actual performance, and the ability to architect the classification to fit the existing resources in a user friendly and effective manner.

As described herein, the disclosed toolchain system and methods enable determination of a type of processor that can optimally perform a portion (e.g., a code segment) of original code. The original code can be legacy code that was written for a particular type of processor. Each code segment of the original code can be focused on different types of computations including, for example, computations that perform a convolution on many pixels, that iterate over a loop, and/or that are recursive. Different types of processors including digital signal processors (DSPs), central processing units (CPU), field-programmable gate arrays (FPGAs), graphical processing units (GPUs), or the like may perform a particular code segment with better temporal, memory, thermal, or performance than others. The present technology enables segmentation of the original code into a plurality of code segments and determination of a type of a processor that best performs computations of a particular code segment. A parsing engine can make the determination of the type of the processor based on a set of rules and/or a trained classifier (e.g., a trained machine learning model). The present technology enables generation of new code segments for a code segment of the original code such that the new code segment can be executed on the determined type of processor. Further, the present technology enables generation of application programming interfaces (APIs) that can interface the new code segment with other generated code segments and/or some portions of the original code. Accordingly, the present technology enables performance improvements relating to the original code through use of heterogenous computing resources.

In one embodiment, a neural parsing classifying engine is able to accept a source code file written in a high-level programming language such as C, ADA or C++, then parse the file into segments classified based on prediction of most optimal use for specific heterogeneous processing elements, such as CPU, GPU or FPGA.

In one embodiment, a neural parsing classifier engine can accept a source code file written in a low-level programming language and parse the file into classified segments based on prediction of most optimal use for specific heterogeneous processing elements, such as CPU, GPU or FPGA.

In one embodiment, a neural parsing classifier engine can accept a binary application file and parse it into segments classified based on prediction of most optimal use for specific heterogeneous processing elements, such as CPU, GPU or FPGA.

In one embodiment, a rule-based classification engine can accept a source code file written in a high-level programming language such as C, ADA or C++, then parse the file into segments classified based on prediction of most optimal use for specific heterogeneous processing elements, such as CPU, GPU or FPGA.

In one embodiment, a rule-based classification engine can accept a binary application file and parse it into segments classified based on prediction of most optimal use for specific heterogeneous processing elements, such as CPU, GPU or FPGA.

In one embodiment, a neural classifier can be trained with large datasets consisting of several program source code written in different languages. Programs can be timed in various configurations with different classified modules running on permutations of computing resources to learn to perform the classification with high certainty of optimal operation. The same resources can be used to test the system for optimal operations.

In one embodiment, the neural classifier can be tested with large datasets consisting of several program source code written in different languages. Programs can be timed in various configurations with different classified modules running on permutations of computing resources to assure certainty of optimal operation.

In one embodiment, a means of optimizing the classification process to fit existing resources, architectures or user desires through weighting certain parameters more favorably than others can be provided.

In one embodiment, a means of predicting the improvement in performance before classification can be provided. In one embodiment, a means of evaluating the actual improvement in performance after classification can be provided. In one embodiment, classifiers can be used with multiple types of FPGAs, including those embedded in Systems on Chip, SoC.

In one embodiment, classifiers can be used with multiple types of programming languages such as C, C++, C#, ADA, FORTRAN, PERL etc. In one embodiment, classifiers can be used with multiple types of PLA. In one embodiment, classifiers can be used with multiple types of GPUs.

In one embodiment, classifiers can be used with multiple types of DSPs. In one embodiment, classifiers can be used with multiple types of CPUs. In one embodiment, output of the classifiers can be used to create Application-Specific Integrated Circuits, ASIC, to further optimize the execution. In one embodiment, APIs can be auto-generated to reassemble amalgamated code.

Figure 8:
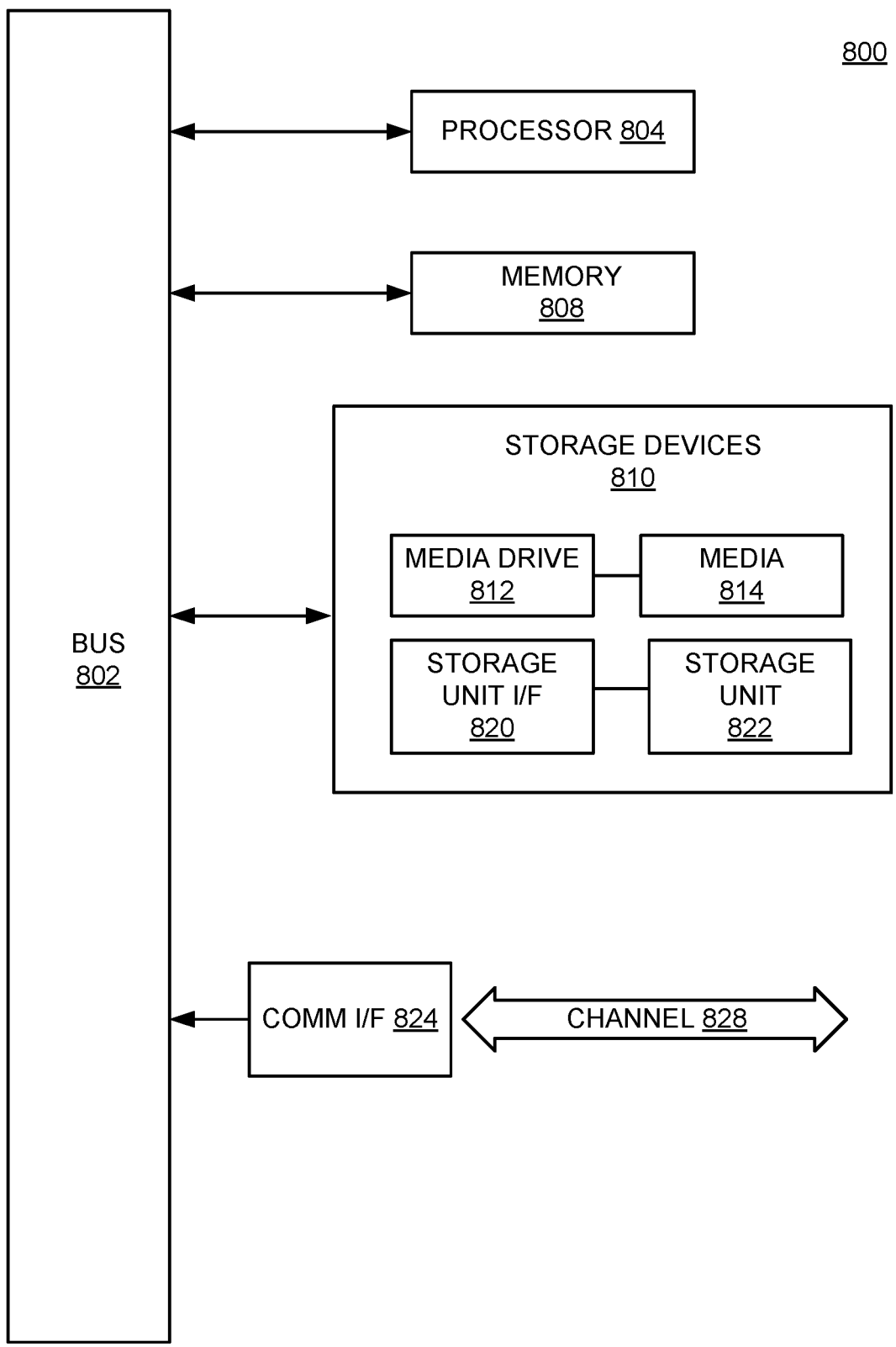
FIG. 8 is an example computing component that may be used to implement various features of embodiments described in the present disclosure.

Referring now to FIG. 8, an example of a computing system 800, or technological environment, is depicted which can implemented the disclosed toolchain system and methods. The computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. This can include a processor 804. Processor 804 might be implemented using a general-purpose or special-purpose processing engine such as, for example, a microprocessor, controller, or other control logic. Processor 904 may be connected to a bus 802. However, any communication medium can be used to facilitate interaction with other components of computing component 900 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 924 might be used to allow software and data to be transferred between computing component 900 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 924. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, the method comprising:
   receiving, by a computing system, original software code;
   providing, by the computing system, the original software code to a parsing engine, wherein the parsing engine segments the original software code into portions based on a set of rules or a neural network;
   assigning, by the computing system, a category to each of the portions of the original software code based on the set of rules or the neural network, wherein the category is associated with parameters and operations within the portion of the original software code; and
   determining, by the computing system, based on the parsing engine, at least one type of a hardware processor for each of the portions of the original software code, wherein the determining comprises matching each of the portions of the original software code to a corresponding type of a hardware processor based on the category for the portion of the original software code.

2. The computer-implemented method of claim 1, wherein the at least one type of the hardware processor includes one of a graphical processing unit (GPU), a central processing unit (CPU), a field-programmable gate array (FPGA), or a digital signal processor (DSP).

3. The computer-implemented method of claim 2, wherein the determining the at least one type of the hardware processor further comprises:
   determining at least two types of hardware processors from the GPU, CPU, FPGA, and DSP.

4. The computer-implemented method of claim 1, wherein the set of fixed rules define a rule for each category of the portions of the original software code matching the respective portion of the original software code to the at least one type of the hardware processor that is an optimal computing resource based on the corresponding category.

5. The computer-implemented method of claim 4, wherein the set of fixed rules quantizes parameters of a multi-dimensional vector, the parameters comprising at least one of memory access, parallelization, looping, recursion, decisions, repeated operations, or timing.

6. The computer-implemented method of claim 5, further comprising:
   generating hypotheses for the parameters;
   executing a sample code segment on the at least one type of the hardware processor;
   measuring at least timing or power consumptions for the at least one type of the hardware processor during the executing the sample code segment; and
   determining in-sample error for the at least one type of the hardware processor.

7. The computer-implemented method of claim 6, further comprising:
   executing a set of code segments on the at least one type of the hardware processor to determine out-sample errors; and
   establishing at least one level of similarity between the in-sample error and out-sample errors.

8. The computer-implemented method of claim 7, further comprising:
   categorizing each code segment of the set of code segments based on a corresponding multi-dimensional vector; and
   determining a type of a hardware processor based on the corresponding multi-dimensional vector.

9. The computer-implemented method of claim 8, further comprising:
   generating training samples that associate the corresponding multi-dimensional vector and the type of the hardware processor; and
   training a classifier with the training samples.

10. The computer-implemented method of claim 9, further comprising:
    matching the training samples with the hypotheses; and
    adjusting the hypotheses to maximize the at least one level of similarity.

11. The computer-implemented method of claim 1, wherein the parsing engine is a trained classifier, wherein the determining the at least one type of the hardware processor for the at least the portion of the original software code based on the parsing engine further comprises:
    segmenting the original software code into a plurality of segments based on the trained classifier.

12. The computer-implemented method of claim 11, further comprising:
    analyzing the plurality of segments for existences of one or more iterative processes, matrix operations, close repetitive memory uses, timing operations with dwell loops, signal processing, recursions, graphical transformations, logic operations, or floating point calculations.

13. The computer-implemented method of claim 11, wherein the trainer classifier is trained based on a set of code segments comprising algorithms that are empirically evaluated on at least two types of the hardware processors.

14. The computer-implemented method of claim 13, wherein the algorithms are empirically evaluated on the at least two types of the hardware processors for any combination of processor usage, power usage, memory usage, and thermal signatures associated with each processor of the at least two types of the hardware processors.

15. The computer-implemented method of claim 3, further comprising:
    generating a set of new code segments for the at least two types of the hardware processors based on the original software code, each code segment of the new code segments associated with a different type of a hardware processor.

16. The computer-implemented method of claim 15, further comprising:
    generating new code that excludes the at least the portion of the original software code, wherein the new code interfaces with the set of new code segments; and
    generating at least one application programming interface (API) that interface the new code to the set of new code segments.

17. The computer-implemented method of claim 1, further comprising:
    receiving a list of available types of hardware processors that excludes a first type of hardware processor;
    determining not to generate a new code segment for the first type of hardware processor; and
    in response, generating a new code segment for a second type of hardware processor.

18. The computer-implemented method of claim 1, further comprising:
    receiving a ranked order of types of hardware processors;
    based on the ranked order, determining that a new code segment is to be generated for a first type of hardware processor over a second type of hardware processor;
    in response, generating a new code segment for the first type of hardware processor.

19. A system comprising:
    at least one hardware processor; and
    a memory storing instructions that, when executed by the at least one processor, cause the system to perform:
    receiving original software code;
    providing the original software code to a parsing engine, wherein the parsing engine segments the original software code into portions based on a set of rules or a neural network;
    assigning a category to each of the portions of the original software code based on the set of rules or the neural network, wherein the category is associated with parameters and operations within the portion of the original software code; and
    determining, based on the parsing engine, at least one type of a hardware processor for each of the portions of the original software code, wherein the determining comprises matching each of the portions of the original software code to a corresponding type of hardware of a hardware processor based on the category for the portion of the original software code.

20. A non-transitory computer-readable medium including instructions that, when executed by at least one hardware processor of a computing system, cause the computing system to perform a method comprising:
    receiving original software code;
    providing the original software code to a parsing engine, wherein the parsing engine segments the original software code into portions based on a set of rules or a neural network;
    assigning a category to each of the portions of the original software code based on the set of rules or the neural network, wherein the category is associated with parameters and operations within the portion of the original software code; and
    determining, based on the parsing engine, at least one type of a hardware processor for each of the portions of the original software code, wherein the determining comprises matching each of the portions of the original software code to a corresponding type of hardware of a hardware processor based on the category for the portion of the original software code.

\* \* \* \* \*